(12) United States Patent
Burgschat

(10) Patent No.: US 6,525,311 B1
(45) Date of Patent: Feb. 25, 2003

(54) SCANNING UNIT FOR OPTICAL POSITION MEASURING DEVICE

(75) Inventor: Reiner Burgschat, Jena (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/706,365

(22) Filed: Nov. 3, 2000

Related U.S. Application Data

(63) Continuation-in-part of application No. 09/565,887, filed on May 5, 2000, now abandoned.

(30) Foreign Application Priority Data

May 7, 1999 (DE) .......................................... 199 21 309

(51) Int. Cl.⁷ .............................................. G01B 11/00
(52) U.S. Cl. .................................. 250/237 G; 356/614
(58) Field of Search .......................... 250/237 G, 208.2, 250/231.13, 231.14, 231.16, 231.18, 234; 356/614, 616, 617, 619, 395, 396; 33/706, 707

(56) References Cited

U.S. PATENT DOCUMENTS

| | | | |
|---|---|---|---|
| 4,985,623 A | * 1/1991 | Ichikawa et al. | ...... 250/231.16 |
| 4,999,623 A | 3/1991 | Affa | |
| 5,841,134 A | 11/1998 | Burgschat et al. | |
| 5,994,692 A | * 11/1999 | Holzapfel | ............... 250/237 G |

FOREIGN PATENT DOCUMENTS

| | | |
|---|---|---|
| DE | 37 26 678 | 3/1989 |
| DE | 2 216 650 | 10/1989 |
| DE | 195 27 287 | 1/1997 |
| EP | 0 395 844 | 11/1990 |

OTHER PUBLICATIONS

Burgschat, Reiner, "Die neue Dimension in Der Weg–un Winkelmesstechnik," F & M, vol. 104, 1996, pp. 752–754 and 756.

U.S. patent application No. 09/586,271 Burgschat et al. Jun. 2, 2000.

U.S. patent application No. 09/565,887 Burgschat May 5, 2000.

* cited by examiner

*Primary Examiner*—Kevin Pyo
(74) *Attorney, Agent, or Firm*—Brinks Hofer Gilson & Lione

(57) ABSTRACT

A scanning unit for an optical position measuring device, which is suitable for scanning a scale in a measurement direction. The scanning unit includes a light source, an incremental signal scanning arrangement, disposed symmetrical around the light source and including a plurality of incremental signal detector elements, which are each disposed relative to one another so that phase-offset partial incremental signals are generated from the scanning of an incremental grating line of a scale. A first reference pulse detector element and a second reference pulse detector element, each of which is disposed vertically to a measurement direction and are each adjacent to the incremental signal scanning arrangement and generate an output reference pulse signal from the scanning of a first reference marking and a second reference marking located at one or more defined reference positions of the scale.

60 Claims, 7 Drawing Sheets

SCANNING UNIT FOR OPTICAL POSITION MEASURING DEVICE

This application is a continuation-in-part of application Ser. No. 09/565,887, filed May 5, 2000, abandoned the entire contents of which are incorporated herein by reference.

Applicant claims, under 35 U.S.C. § 119, the benefit of priority of the filing date of May 7, 1999 of a German patent application Serial Number 199 21 309.7, filed on the aforementioned date, the entire contents of which is incorporated herein by reference.

BACKGROUND OF THE INVENTION

1. Field of the Invention

The present invention relates to a scanning unit for an optical position measuring device. The scanning unit is suitable not only for generating incremental signals but also in particular for generating reference pulse signals.

2. Discussion of Related Art

Known incremental position measuring devices offer not only the generation of position-dependent incremental signals but usually also the capability of generating so-called reference pulse signals at one or more defined points along the measurement path. With the aid of the reference pulse signals, an absolute reference in the position measurement can then be furnished in a known manner.

The scanning unit of an incremental position measuring device, described in the publication by R. Burgschat, entitled "Die neue Dimension der Weg- und Winkelmesstechnik" ["The Novel Dimension in Travel and Angle Measurement Technology"] in F&M 104 (1996) 10, pages 752–756, also offers the capability of detecting reference pulse signals at one or more points of the measurement path. The scanning unit here includes a first photodiode array, which is used to generate the incremental signals; this photodiode array is also described in German Patent Application DE 195 27 287 A1. Spaced apart in the measurement direction from it and offset vertically from the measurement direction is a second photodiode array. The second photodiode array serves to generate the reference pulse signal; that is, in this way a reference marking on a side of a scale, which marking is disposed laterally adjacent to the incremental grating line in a line of reference markings, can be detected photoelectrically.

If the reference pulse signal is generated in this way, incorrect measurements can occur under certain circumstances. For instance, local soiling of the scale in the region of the line of reference markings can for instance lead to the generation of a reference pulse signal. Furthermore, if there is miscalibration of the scanning unit and scale about an axis perpendicular to the plane of the scale, the reference pulse signal is no longer assuredly in a location- invariant position relative to the incremental signals.

A scanning unit in accordance with the species, which avoids the above problems, was proposed in German Patent Application 199 21 309.7 and U.S. patent application Ser. No. 09/565,887, filed May 5, 2000. However, in connection with this scanning unit it has been found not to be optimal that in case of an undesired change of the scanning distance, i.e. the distance between the scanning unit and the scale, an uneven change in the incidence of light results, in particular on the compensation detector elements.

The compensation detector elements are used for generating a compensation signal, or a so-called constant light level, which is required for further processing of the different scanning signals. Thus, an uneven light incidence on the compensation detector elements results in errors in the further processing of the signals.

OBJECTS AND SUMMARY OF THE INVENTION

An object of the present invention is therefore to disclose a scanning unit for an optical position measuring device in which the above-discussed problems in conjunction with the generation of reference pulse signals are avoided as much as possible. A compact structure of the corresponding scanning unit is also desirable.

This object is attained by a scanning unit for an optical position measuring device, which is suitable for scanning a scale in a measurement direction. The scanning unit includes a light source, an incremental signal scanning arrangement, disposed symmetrical around the light source and including a plurality of incremental signal detector elements, which are each disposed relative to one another so that phase-offset partial incremental signals are generated from the scanning of an incremental grating line of a scale. A first reference pulse detector element and a second reference pulse detector element, each of which is disposed vertically to a measurement direction and are each adjacent to the incremental signal scanning arrangement and generate an output reference pulse signal from the scanning of a first reference marking and a second reference marking located at one or more defined reference positions of the scale.

Another aspect of the present invention that attains the above-mentioned object regards an optical position measuring device that includes a scanning unit as described above.

The provisions according to the invention now assure that any possible rotation of the scanning unit relative to the scale about an axis oriented perpendicular to the plane of the scale will not lead to an incorrect determination of the reference position. On the contrary, in this case as well, the stable phase relationship of the generated reference pulse signal relative to the incremental signals is assured.

Furthermore, because of the generation of the reference pulse signal according to the present invention, the insensitivity to soiling is markedly increased. While in a system with reference markings disposed on only one side adjacent to the incremental grating line, local soiling in this region can lead to the erroneous generation of a reference pulse signal, when the scanning unit of the present invention is used, no output reference pulse signal caused by possible soiling of the scale can be generated. The reason for this is the fact that according to the present invention, two reference marking tracks adjacent to the incremental grating line are scanned; only if partial reference pulse signals are actually detected in both reference marking tracks does any output reference pulse signal whatever result.

Furthermore, it can be noted that now both for scanning the incremental grating line and for scanning the reference markings on the scale, only a single light source is required. By comparison, the scanning unit described in the aforementioned Burgschat publication requires two separate light sources.

Overall, because of the provisions of the present invention, an extremely compact scanning unit for an optical position measuring device is obtained that can also be used in tight spaces.

It is naturally also possible to use the scanning unit of the present invention in both linear and in rotary position measuring devices.

Another object and advantage of the present invention regards a scanning unit for an optical position measuring device, wherein it is assured that an even change of the light incidence on the various compensation detector elements results, even in case of a possible change of the scanning distance.

The above object and advantage is accomplished by one aspect of the present invention that includes a scanning unit with a plurality of compensation detector elements, which are used for generating a compensation signal, wherein the plurality of compensation detector elements are arranged in such a way, that each of the centers of gravity of their corresponding areas are located on a circle whose center coincides with an optical axis of the light source.

The above aspect of the present invention assures that an even change of the light incidence on all compensation detector elements, and therefore of the constant light level, results, even in case of a possible change of the scanning distance caused, for example, by guidance tolerances.

This is assured in accordance with the above aspect of the present invention in that the compensation detector elements are arranged in such a way, that the centers of gravity of their areas are all located on a circle whose center coincides with the optical axis of the system. Here, the position of the optical axis is defined by the centrally arranged light source of the scanning unit. Reference pulse detector elements are preferably also arranged in such a way that the centers of gravity of their areas lie on the mentioned circle. Moreover, it has been shown to be advantageous if the total area of all reference pulse detectors is selected to be identical to the total area of all compensation detector elements. Furthermore, the insensitivity of the reference pulse signal generation to possible tilting of the scanning unit, already mentioned in German Patent Application 199 21 309.7, continues to be assured. The same applies to the insensitivity of the reference signal generation to possible dirt accumulation on the scale.

Further advantages and details of the scanning unit of the present invention will become apparent from the ensuing description of an exemplary embodiment of the scanning unit of the present invention as well as a plurality of evaluation circuit arrangements, in conjunction with the accompanying drawings.

DETAILED DESCRIPTION OF THE PREFERRED EMBODIMENTS OF THE INVENTION

Figure 1:
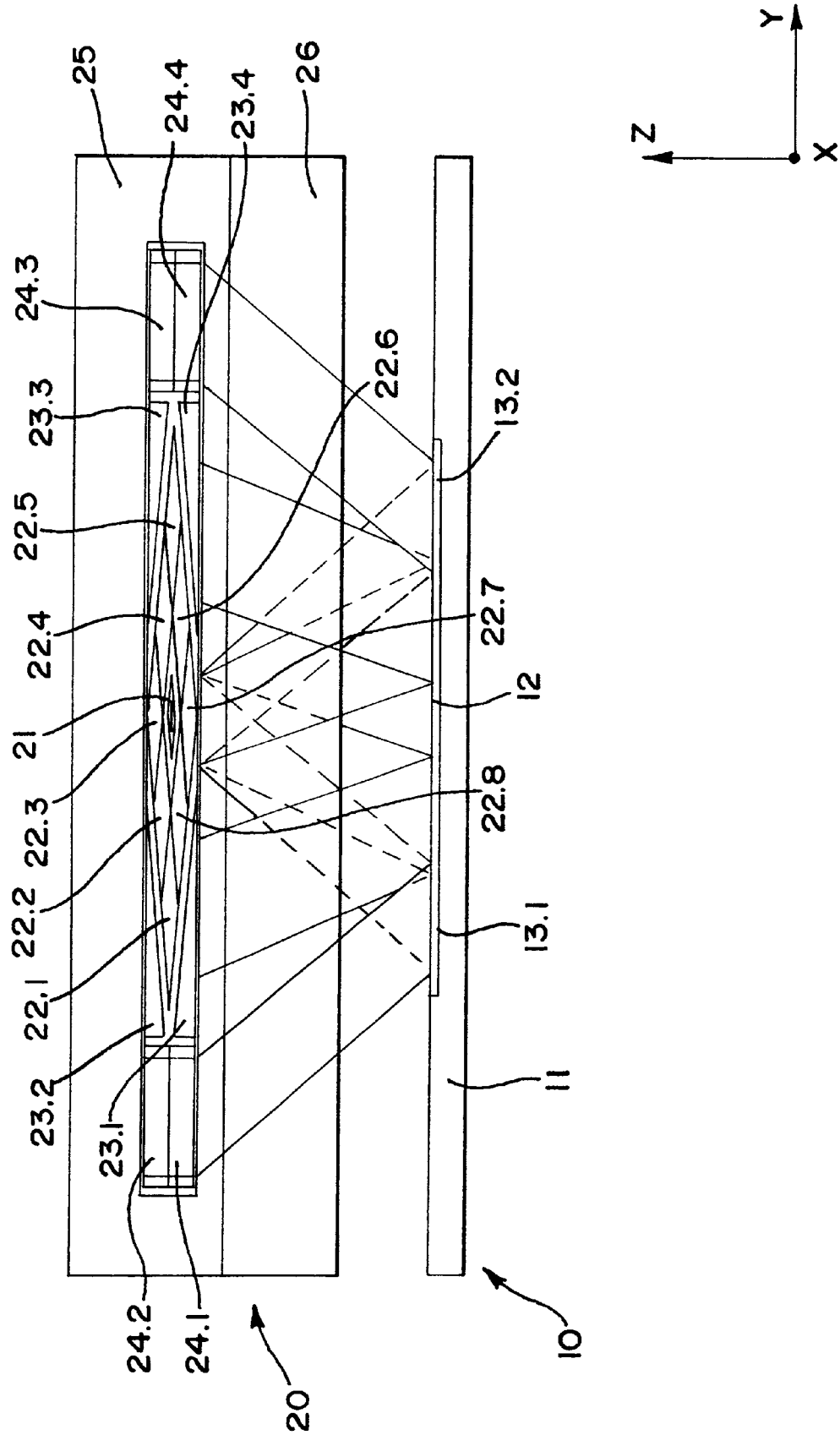
FIG. 1 is a schematic view of a first embodiment of a scanning unit according to the present invention in conjunction with a scanned scale.

In FIG. 1, a schematic view of an optical position measuring device is shown that includes not only the scanning unit 20 of the present invention but also the scale 10 scanned with it. The scale 10 employed is shown in a plan view in FIG. 2. FIG. 3 shows a more-detailed view of the detector plane of the scanning unit 20.

The scanning unit 20 and the scale 10 are disposed so as to be displaceable relative to one another in the measurement direction x indicated; the measurement direction x is thus oriented perpendicular to the plane of the drawing in FIG. 1.

The exemplary embodiment shown of the optical position measuring device is used to detect linear relative motions of the scanning unit 20 and scale 10. A correspondingly embodied position measuring device can be used for instance in a numerically controlled machine tool. The various position-dependent scanning signals generated by the position measuring device are transmitted here for further processing to an evaluation unit, not shown, such as a numerical controller for a machine tool.

As an alternative to the linear variant shown, the scanning unit 20 of the invention can naturally also be used in measurement arrangements for rotational relative motions.

Figure 2:
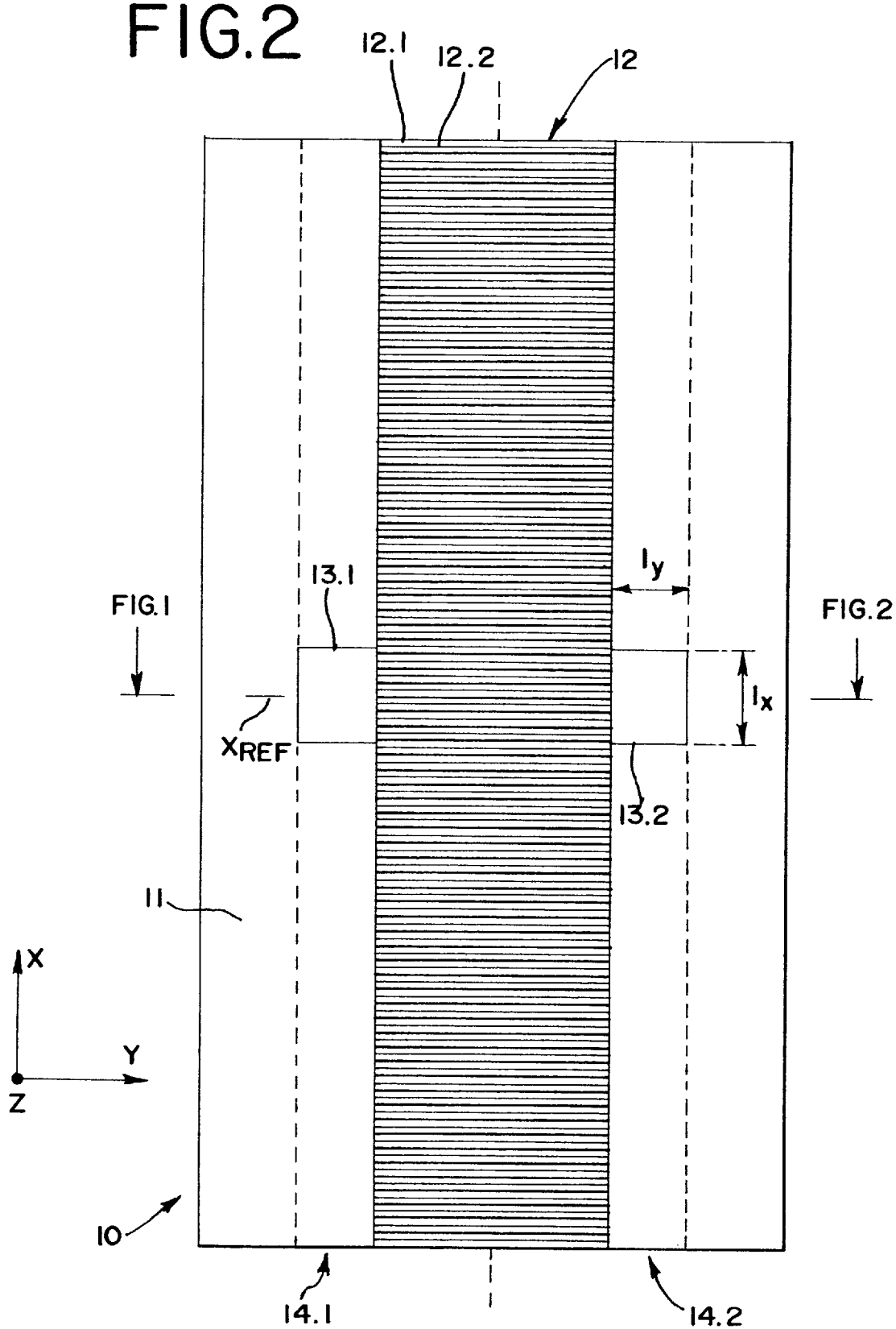
FIG. 2 is a plan view of the scanned scale of FIG. 1.
Figure 3:
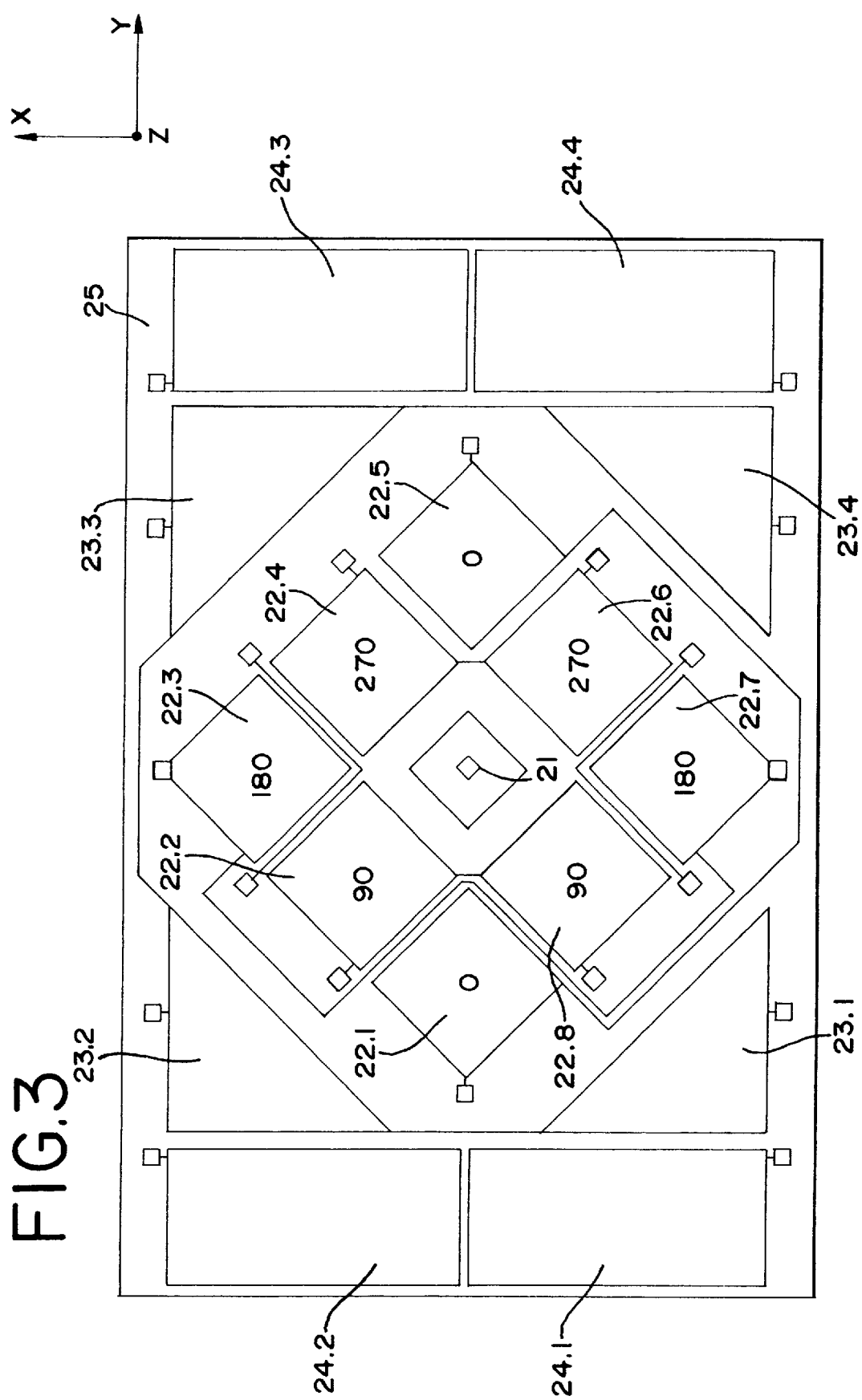
FIG. 3 is a plan view on the detector plane of the scanning unit of FIG. 1.

The scanned scale 10 in the exemplary embodiment of FIGS. 1–3 includes a substrate body 11, on the middle of which an incremental grating track 12 is disposed in the measurement direction x. Periodically disposed reflective portions 12.1 and nonreflective portions 12.2 extend in the measurement direction x in the incremental grating track 12, and their longitudinal axes are each oriented in the y direction indicated, or, in other words, are perpendicular to the measurement direction x. The grating period TP of the incremental grating track 12 is selected as TP=20 $\mu$m, for instance, in one possible embodiment. As the substrate body 11, a metal strip can for instance be used, on which the portions 12.1, 12.2 with the appropriate optical properties are embodied in the region of the incremental grating track 12.

The material embodiment of the scale 10 is not essential to the invention here; that is, in principle, the scale 10 can be realized in some alternative way to the embodiment indicated here.

Laterally adjacent to the incremental grating track 12, two reference markings 13.1, 13.2 are also disposed, in the example shown, at a reference position $X_{REF}$ in two reference marking tracks 14.1, 14.2. With the aid of the reference markings 13.1, 13.2, an unequivocal absolute position is thus defined along the measurement path, by way of which position the absolute reference of the high-resolution incremental measurement can be established in a known manner.

It is understood that such reference markings 13.1, 13.2 can also be mounted in pairs at further points along the reference marking tracks 14.1, 14.2, at suitable reference positions $X_{REF}$ of the scale 10. It is also possible for instance to provide so-called spacing-encoded reference markings and to scan them according to the present invention, and so forth.

In the exemplary embodiment of FIGS. 1–3, the two reference markings 13.1, 13.2 disposed laterally adjacent to the incremental grating track 12 have a length $l_x=200$ μm in the measurement direction x; the length $l_y$ of the reference markings 13.1, 13.2 in the line direction of the incremental grating track 12 is selected as $l_y=500$ μm, for instance.

In this example, the reference markings 13.1, 13.2 are embodied as nonreflective regions on the otherwise reflective substrate body 12.

In conjunction with the various optical properties of the portions 12.1, 12.2 in the incremental grating track 12, or of the reference markings 13.1, 13.2 in the reference marking tracks 14.1, 14.2, it should be emphasized at this point that a design as specified above is understood not to be absolutely required. For instance, it can suffice in the incremental grating track 12 to embody alternating portions 12.1, 12.2 of different high reflectivity. The reference markings 13.1, 13.2 in the reference marking tracks 14.1, 14.2 could also be designed as highly reflective, while the adjacent regions of the substrate body surface are merely slightly reflective, and so forth.

As already indicated above, such an arrangement of two reference markings 13.1, 13.2 laterally adjacent to the incremental grating track 12 has pronounced advantages over the disposition of a reference marking on only one side. For instance, local soiling, which also optically reduces reflection and is located adjacent to the incremental grating track 12, is thus practically precluded from being interpreted as a reference marking. This is assured by the processing, to be described in further detail hereinafter, of the resultant scanning signals from both reference markings 13.1, 13.2.

In the event of rotation of the scanning unit 20 relative to the scale 10 about the z axis, it is also assured that the phase relationship of the output reference pulse signal generated last will not vary undesirably compared with the incremental signals.

A row of important components, all disposed in a single component unit, can be seen on sides of the scanning unit 20 of the present invention, in the schematic view of FIG. 1. In conjunction with the description of the scanning unit 20 of the present invention, FIG. 3 should also be referred to at this point, which shows a view of the detector plane in the scanning unit 20.

The scanning unit 20 of the present invention includes a centrally disposed light source 21, such as a suitable LED. The light source 21 serves both to illuminate the incremental grating track 12 on the scale 10 and to illuminate the reference markings 13.1, 13.2 on the scale 10. An arrangement of a plurality of incremental signal detector elements 22.1–22.8 is provided around the light source 21; hereinafter, they will be called the incremental signal scanning arrangement for short. In the exemplary embodiment shown, the incremental signal scanning arrangement of the scanning unit 20 includes a total of eight separate incremental signal detector elements 22.1–22.8, each embodied in square form. The incremental signal detector elements 22.1–22.8 are disposed relative to one another such that in the corresponding incident light scanning of the incremental grating track 12 on the scale 10, phase-offset partial incremental signals result from the various incremental signal detector elements 22.1–22.8. The relative phase relationships of the partial incremental signals from the various incremental signal detector elements 22.1–22.8 are each shown in FIG. 3. As a result of the push-pull interconnection, indicated in FIG. 3, of the corresponding detector elements, a pair of sine-wave or cosine-wave incremental signals in phase quadrature can be generated in a known manner.

The known way in which the incremental signals are generated will not be addressed here, either; the aforementioned publication of R. Burgschat and DE 195 27 287 A1 are referred to in this connection.

For photoelectric scanning of the reference markings 13.1, 13.2, disposed adjacent to the incremental grating track 12 on the scale 10, the scanning unit 20 of the present invention, in the exemplary embodiment shown, now includes a total of four reference pulse detector elements 24.1–24.4. Each pair of reference pulse detector elements 24.1–24.4 here serves to scan one of the two reference markings 13.1, 13.2, or reference marking tracks 14.1, 14.2, on the scale 10. The two reference pulse detector elements 24.1, 24.2 shown on the left in FIG. 3 serve to scan the reference marking line 14.1 located on the left in FIG. 1; the two reference pulse detector elements 24.3, 24.4 shown on the right in FIG. 3 are used for scanning the reference marking line 14.2 shown on the right in FIG. 1.

The four reference pulse detector elements 24.1–24.4, in the exemplary embodiment shown, are all embodied identically rectangularly, and the longitudinal axes of the rectangles are each oriented in the measurement direction x. In principle, it is understood that some other geometry of the reference pulse detector elements can be selected instead.

The respective two reference pulse detector elements 24.1 and 24.2, and 24.3 and 24.4, intended for scanning a respective reference marking 13.1, 13.2, are offset from one another in the measurement direction x, so that when the respective reference marking 13.1, 13.2 is scanned, two phase-offset partial reference pulse signals result. The spacing of the two thus-generated partial reference pulse signals, in the embodiment shown, is approximately 0.5 mm in the measurement direction x, which for a grating period of the incremental grating line defined as TP=20 μm then correspondingly makes up 25 signal periods of the incremental signal.

The various optoelectronic components, such as the light source and detector elements, are all disposed on the same side of a substrate body 25 in the scanning unit 20. The components are protected against mechanical damage during measurement operation by a glass plate 26 disposed above the components.

Figure 5A:
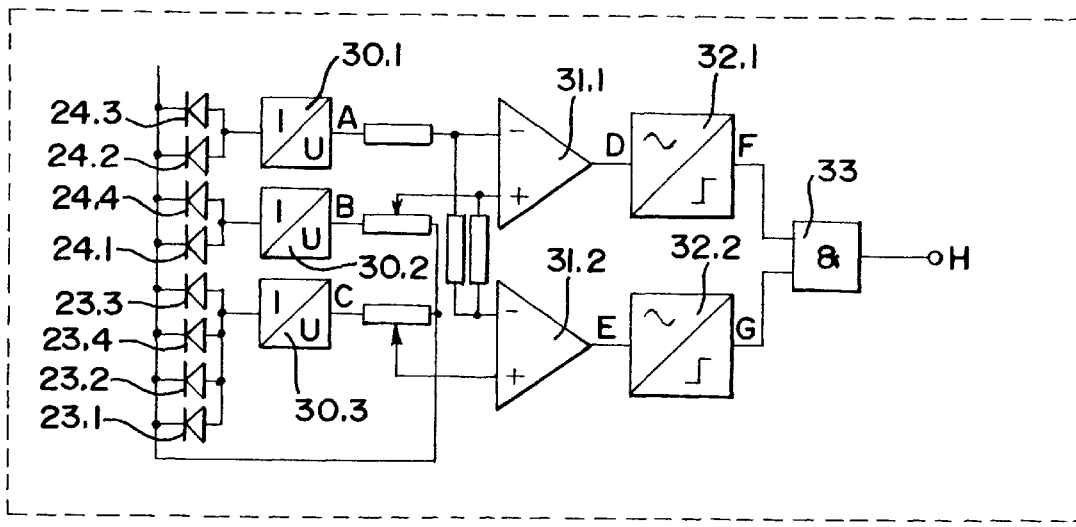
FIG. 5a is a block circuit diagram of a first embodiment of a circuit arrangement for generating an output reference pulse signal from the signals detected by the scanning units of FIGS. 1 and 4.
Figure 5B:
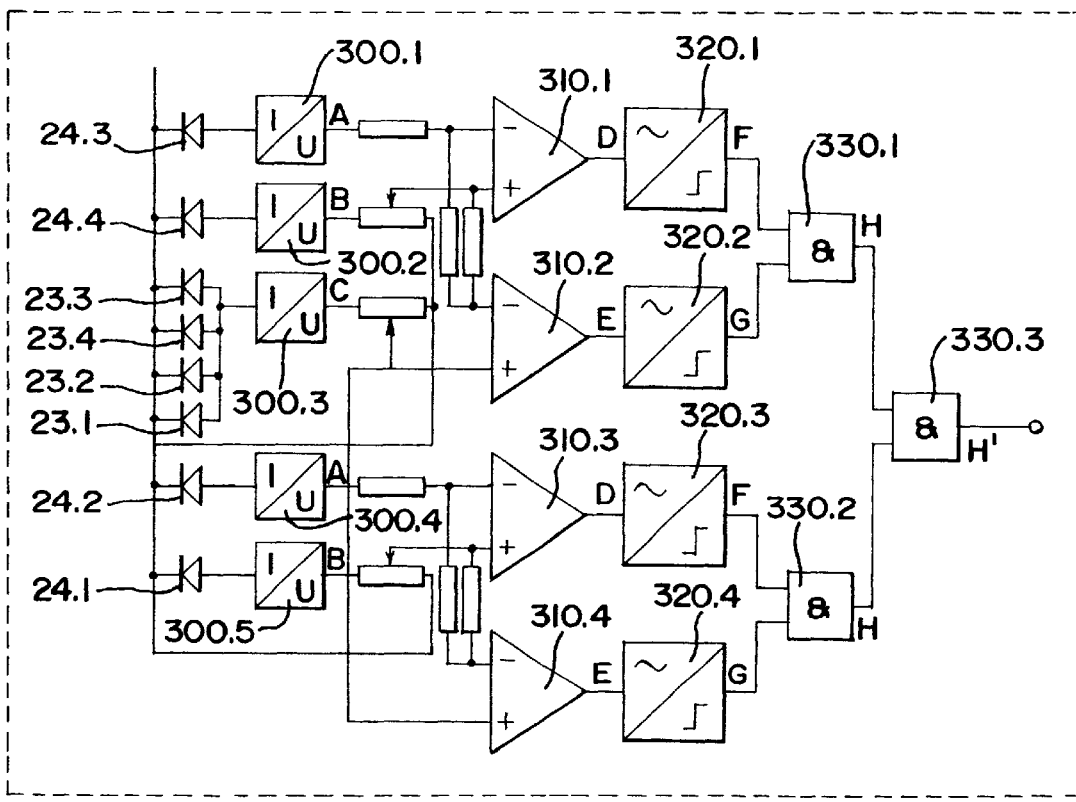
FIG. 5b is a block circuit diagram of a second embodiment of a circuit arrangement for generating an output reference pulse signal from the signals detected by the scanning units of FIGS. 1 and 4.

In conjunction with the processing of the signals and the generation of the output reference pulse signal that is finally to be transmitted to the evaluation unit, the ensuing description of the circuit arrangements in FIGS. 5a and 5b will be mentioned here.

For the further processing of the partial reference pulse signals and for the processing of the partial incremental signals generated, a total of four compensation detector elements 23.1–23.4 are also disposed on sides of the scanning unit 20. The compensation detector elements 23.1–23.4 in this embodiment each have the form of an isosceles triangle and are disposed between the arrangement having the incremental signal detector elements 22.1–22.8 and the reference pulse detector elements 24.1–24.2. All the compensation detector elements 23.1–23.4 are connected in series with one another, as can be seen in FIG. 3.

Because of the selected arrangement of the various detector elements, an extremely compact design of the scanning unit 20 is thus obtained. At the same time, however, large enough areas are available on the detector for detecting the various scanning signals.

In measurement operation, the compensation detector elements 23.1–23.4 are acted upon by reflected light from the region of the incremental grating track 12. Because the three-dimensional compensation detector elements 23.1–23.4 are relatively long in the measurement direction x and because of their serial interconnection selected, the result in the scanning of the incremental grating track 12 is a compensation signal with a signal level that remains approximately constant. As to the use of the compensation signal in generating the output reference pulse signal, once again the ensuing description of possible circuit arrangements in FIGS. 5a and 5b is referred to.

Figure 4:
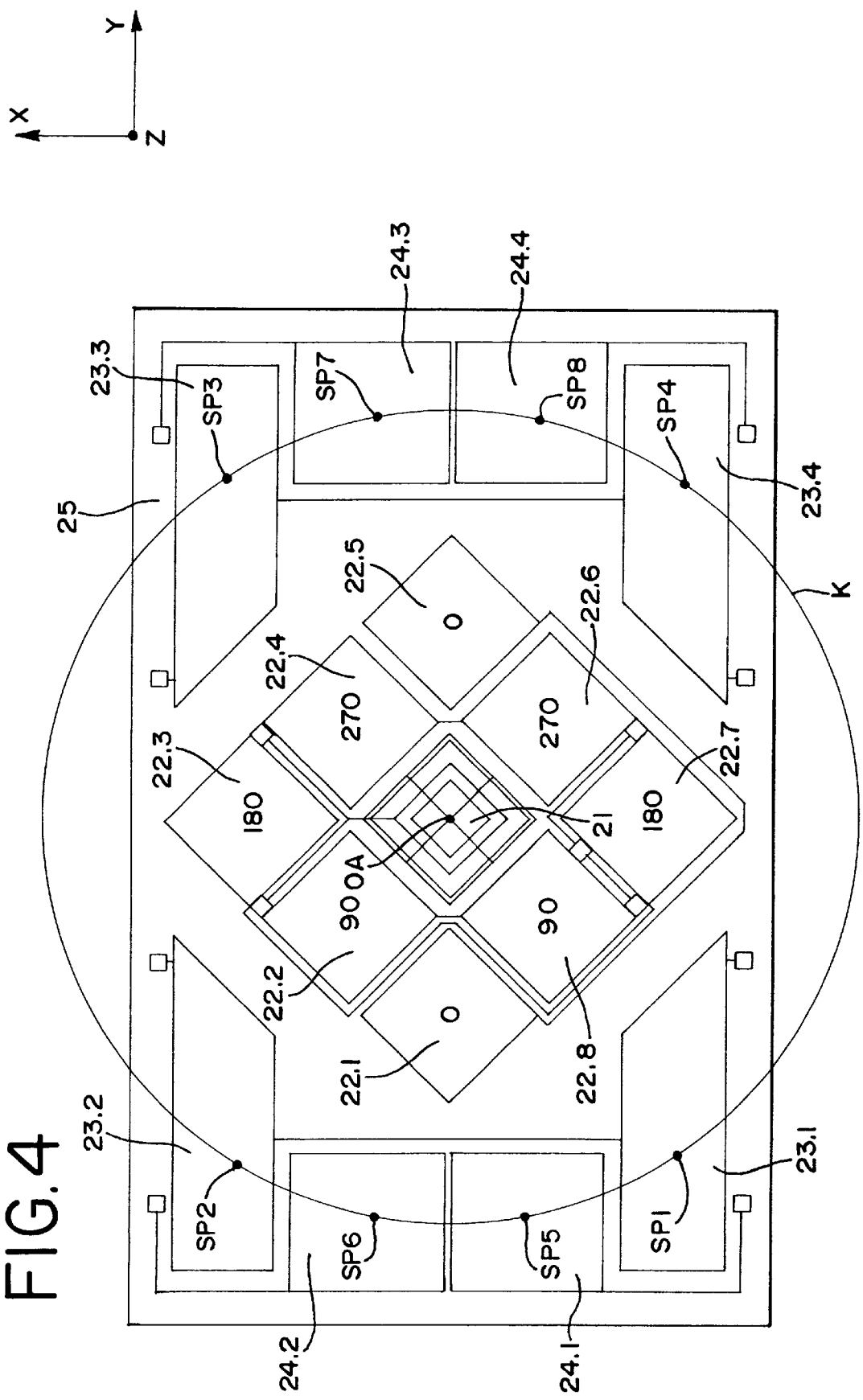
FIG. 4 is a top plan view on the detector plane of a second embodiment of a scanning unit according to the present invention that can be used in conjunction with the scanned scale of FIGS. 1 and 2.

A second embodiment of a scanning unit 20 in accordance with the present invention is shown in FIG. 4, which shows a plan view of the detector plane in the scanning unit 20. The scanning unit 20 of FIG. 4 can replace the scanning unit 20 of FIG. 3 in the system of FIG. 1 so as to scan the scale 10 of FIG. 2.

The scanning unit 20 shown in FIG. 4 includes a centrally arranged light source 21, for example a suitable LED. Here, the light source 21 is used for illuminating the incremental graduation track 12 on the scale 10, as well as for illuminating the reference markers 13.1, 13.2 thereon, such as shown in FIGS. 1 and 2. An optical axis OA of the scanning unit is defined by the geometric center of the light source 21 and is oriented perpendicularly in respect to the drawing plane.

An arrangement of several incremental signal detector elements 22.1 to 22.8, which will be called incremental signal scanning arrangement for short in what follows, is provided symmetrically around the light source 21, or respectively around the optical axis OA as shown in FIG. 4. In the example represented, the incremental signal arrangement of the scanning unit 20 comprises a total of eight separate incremental signal detector elements 22.1 to 22.8, each of which is embodied to be square. Here, the incremental signal detector elements 22.1 to 22.8 are arranged in respect to each other in such a way that, with appropriate incident light scanning of the incremental graduation track 12 on the scale 10, phase-shifted partial incremental signals result from the various incremental signal detector elements 22.1 to 22.8. Each of the relative phase positions of the partial incremental signals from the various incremental signal detector elements 22.1 to 22.8 is represented in FIG. 4. It is possible via the push-pull connection of the respective detector elements indicated in FIG. 4 to generate a pair of sine- or cosine-shaped incremental signals, which are phase-shifted by 90°, in a known manner.

The known manner of generating incremental signals will not be further discussed here, reference is made in this connection to the above-mentioned publication of R. Burgschat, as well as to DE 195 27 287 A1.

For the photoelectric scanning of the reference markers 13.1, 13.2, arranged adjoining the incremental graduation track 12 on the scale 10, the scanning unit in accordance with the invention represented in the embodiment shown in FIG. 4 includes a total of four reference pulse detector elements 24.1 to 24.4. One pair each of the reference pulse detector elements 24.1 to 24.4 here is used for scanning one of the two reference markers 13.1, 13.2, or the reference marker tracks 14.1, 14.2 on the scale 10 of FIGS. 1 and 2. The two reference pulse detector elements 24.1, 24.2 arranged on the left in FIG. 4 are used for scanning the reference marker track 14.1, arranged on the left in FIG. 1, the two reference pulse detector elements 24.3, 24.4 arranged on the right in FIG. 4 are used for scanning the reference marker track 14.2, arranged on the right in FIG. 1.

In the embodiment of the present invention shown in FIG. 4, it is now provided to arrange the four reference pulse detector elements 24.1 to 24.4 in such a way that the centers of gravity of their areas SP5 to SP8 are located on a circle K, whose center coincides with the optical axis OA.

In the embodiment shown in FIG. 4, all four reference pulse detector elements 24.1 to 24.4 are identically designed to be square in order to utilize the available area as optimally as possible. However, in principle it would also be possible to select an alternative geometry of the reference pulse detector elements 24.1 to 24.4, for example circular, etc.

The two reference pulse detector elements 24.1 and 24.2, or 24.3 and 24.4, respectively provided for scanning a reference marker 13.1, 13.2, are arranged offset in the measuring direction x, so that when the respective reference markers 13.1, 13.2 are scanned, two phase-shifted partial reference pulse signals result. In the embodiment represented, the distance between the two partial reference signals generated in this way in the measuring direction x is approximately 0.5 mm which, at a graduation period of the incremental graduation track of TP=20 $\mu$m, correspondingly comes to 25 signal periods of the incremental signal.

The various optoelectronic components, such as the light source and the detector elements, are all arranged in the scanning unit 29 on one side of a support body 25. The components are protected against mechanical damage in the course of the measuring operation by a glass plate 26, arranged above the components.

In connection with the processing of the signals and the generation of the output reference pulse signal, which in the end is to be transmitted to the evaluation unit, reference is made here to the subsequent description of the circuits in FIGS. 5a and 5b.

As shown in FIG. 4, a total of four compensation detector elements 23.1 to 23.4 is furthermore provided on the part of the scanning unit 20 for further processing of the partial reference signal pulses, as well as the processing of the generated partial incremental signals. In accordance with the invention it is provided to arrange all the compensation detector elements 23.1 to 23.4 distributed around the incremental signal scanning arrangement in such a way, that the centers of gravity of their areas SP1 to SP4 are located on the circle whose center coincides with the optical axis OA.

It is possible in this manner to assure that the compensation detector elements 23.1 to 23.4 register a uniform change of the incident light in case of a possible change of the scanning distance.

Moreover, the total area of all reference pulse detector elements 24.1 to 24.4 of the scanning unit 20 shown in FIG. 4 has been selected to be identical to the total area of all compensation detector elements 23.1 to 23.4. Because of this, the constant levels in all reference pulse detector elements 24.1 to 24.4, as well as in all compensation detector elements 23.1 to 23.4, changes in the same way in case of a variation of the scanning distance, and can be appropriately compensated during the subsequent signal processing.

Basically, an alternative number of reference pulse detector elements would be conceivable, as well as an alternative number of compensation detector elements, as long as the requirement regarding the uniformity of the respective total areas is maintained.

In the embodiment of the scanning unit 20 shown in FIG. 4, the compensation detector elements 23.1 to 23.4 each have a shape of a trapezoid resulting from the combination of a rectangle and an isosceles triangle, such as indicated by the compensation detector element 23.2. In this case the longitudinal axis of the rectangle is oriented perpendicularly in respect to the measuring direction x. The length of the two legs of the triangle is selected to be identical to the width of the rectangle, wherein one leg of the rectangle adjoins the side of the rectangle, which is oriented in the direction of the incremental detector arrangement.

The shape selected for the compensation detector elements 23.1 to 23.4 again results from the optimization of the available space, but basically an alternative geometry of the compensation detector elements 23.1 to 23.4 would of course also be conceivable.

All compensation detector elements 23.1 to 23.4 are serially connected with each other, as can be seen in FIG. 4.

Thus, as a result of the selected arrangement of the various detector elements there is an extremely compact design of the scanning unit 20 shown in FIG. 4. But sufficiently large areas for the detection of the various scanning signals are available at the same time.

The compensation detector elements 23.1 to 23.4 of the scanning unit 20 shown in FIG. 4 are charged with reflected light from the area of the incremental graduation track 12 during measuring operations. Because of the relatively large spatial extension of the compensation detector elements 23.1 to 23.4 in the measuring direction x, and of their serial connection selected, a compensation signal with the greatest possible uniform signal level results in the course of scanning of the incremental graduation track 12. In connection with the use of the compensation signal in the course of generating the initial reference pulse signals, reference is again made to the subsequent description of possible circuit arrangements in FIGS. 5a and 5b.

FIG. 5a shows a first embodiment of a circuit arrangement with which it is possible to generate an output reference pulse signal H via the scanning units 20 described above with respect to FIGS. 1–4. Within the context of the ensuing description of this circuit arrangement, reference may also be had to FIGS. 6a–6d, which illustrate various signals A-H in the region of the reference position $X_{REF}=0$ to be detected, which signals play a role in the generation of the desired output reference pulse signal.

Figure 6A:
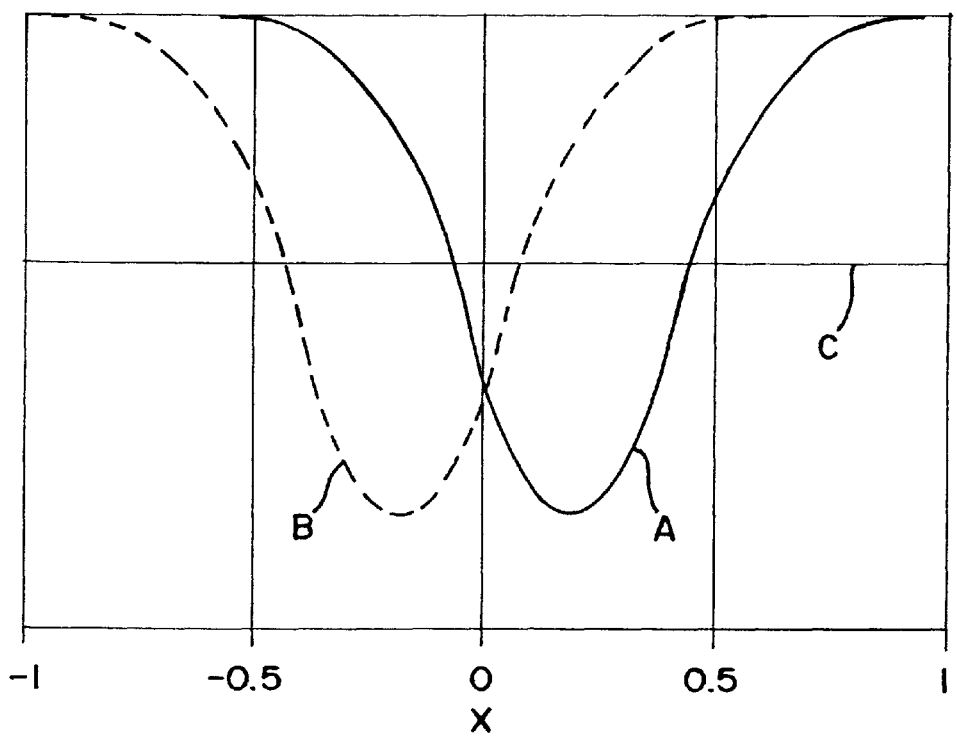
FIGS. 6a–6d show various views of signals within the block circuit diagrams of FIGS. 5a and 5b, in conjunction with which the generation of output reference pulse signals by the scanning units of FIGS. 1 and 4.

In the evaluation variant of FIG. 5a, the partial reference pulse signals detected via the two reference pulse detector elements 24.3, 24.2 reach a first current-to-voltage converter 30.1; the partial reference pulse signals detected via the two reference pulse detector elements 24.4, 24.1 reach a second current-to-voltage converter 30.2. The two signals A and B, which are shown in FIG. 6a in the region of the reference position $X_{REF}=0$, are located at the outputs of the two current-to-voltage converters 30.1, 30.2.

Accordingly, those reference pulse detector elements 24.1–24.4 that are directly opposite one another in the scanning unit perpendicular to the measurement direction x are connected in series with the inputs of current-to-voltage converters 30.1, 30.2.

The partial compensation signals detected via the four series-connected compensation detector elements 23.1–23.4 reach a third current-to-voltage converter 30.3. The result at its output is then the compensation signal C, with a signal level that remains virtually constant, which is again shown in FIG. 6a.

Figure 6B:
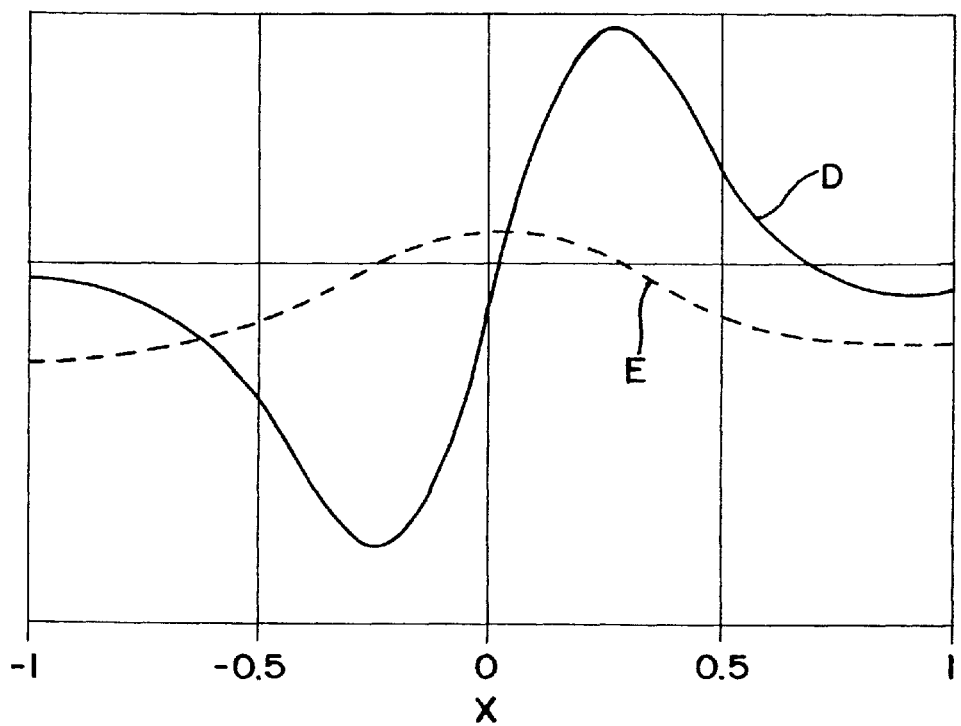

From the signals A, B and C, the difference between and the sum of the two analog signals A and B is subsequently formed by suitably wired operational amplifiers 31.1, 31.2. Then the subtraction signal, which is the result of subtracting the signal B from the signal A, takes the form of signal D (D=A−B), is located at the output of the first operational amplifier 31.1, and the addition signal E, which is the result of subtracting the signal C from the sum of the two signals A and B (E=A+B−C), results at the output of the second operational amplifier 31.2. The thus-generated signals D and E are shown in FIG. 6b.

Figure 6C:
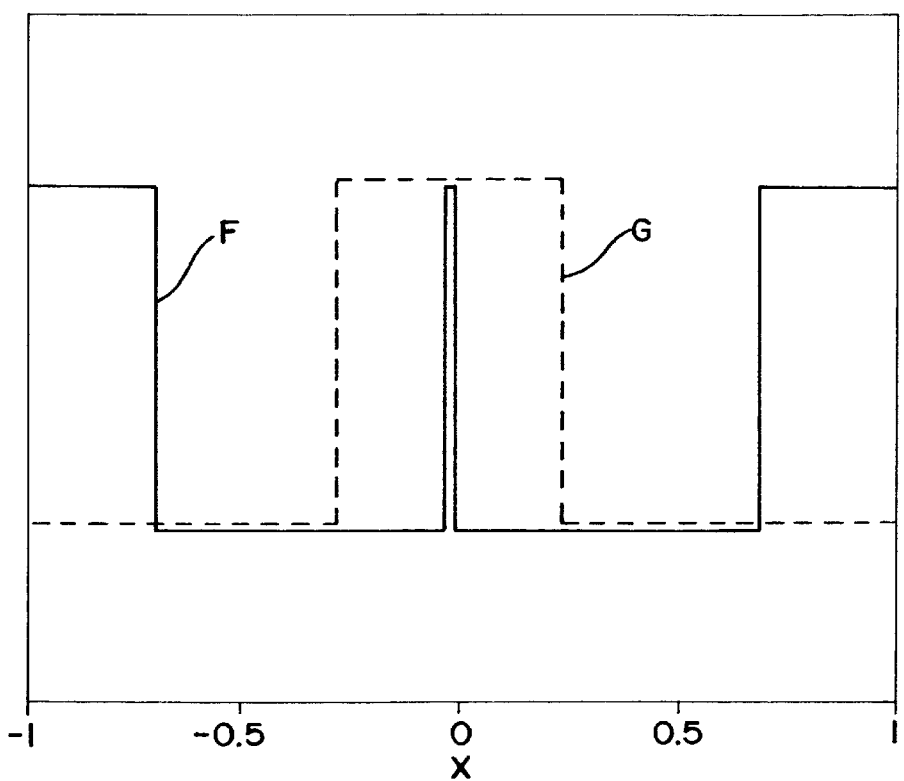

From the two signals D and E, via the two window comparators 32.1, 32.2, corresponding square-wave signals F and G are then generated, which are shown in FIG. 6c.

Figure 6D:
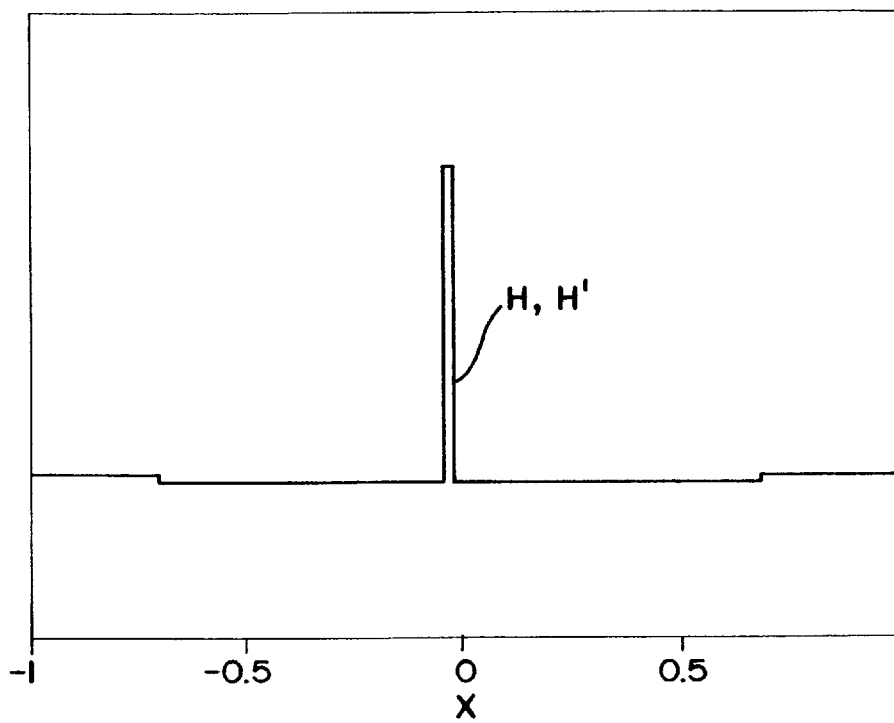

Next, the signals F and G are delivered to a combination unit 33, which performs a logical AND combination between these signals. After the corresponding AND combination, the desired output reference pulse signal H, which in turn is shown in FIG. 6d, is then finally present at the output of the combination unit 33, at the reference position $X_{REF}=0$.

This embodiment of a possible circuit arrangement for generating an output reference pulse signal is now constructed especially simply and includes only a few electronic components.

In addition, the aforementioned demand for invariance of the phase relationship between the output reference pulse signal and the incremental signals in the event of rotation about the z axis is also assured.

In conclusion, a second embodiment of a circuit arrangement for generating an output reference pulse signal from the various signals that detected via the scanning unit of the invention will be explained in conjunction with FIG. 5b.

Unlike the above example, what takes place now is a separate processing of the partial reference pulse signals of those reference pulse detector elements that are each disposed on a side of the scanning unit 20 and are intended for scanning a reference marking on the scale 10. In the example shown, a first processing channel associated with the right side of the scanning units 20 of FIGS. 3 and 4 is accordingly provided in the circuit arrangement shown, and in it the partial reference pulse signals of the two reference pulse detector elements 24.3, 24.4 that result from the scanning of the first reference marking 13.1 are processed; in a second processing channel associated with the left side of the scanning units 20 of FIGS. 3 and 4, the partial reference pulse signals of the two reference pulse detector elements 24.1, 24.2 that result from the scanning of the second reference marking 13.2 are processed. Accordingly, per processing channel, only the partial reference pulse signals of detector elements that result from the scanning of the same reference marking on the scale are processed. In the other processing channel, the signal processing is done for those partial reference pulse signals that result from the scanning of the opposed reference marking.

Conversely, in both processing channels, the signals generated via the compensation detector elements 23.1–23.4 are used jointly. The particular advantages of this evaluation arrangement for signal processing will be addressed in further detail in the course of the ensuing description.

The partial reference pulse signals generated via the four reference pulse detector elements 24.1–24.4 are now each delivered to one of the current-to-voltage converters 300.1–300.2 and 300.4–300.5, which are also four in number. The result in the first processing channel, at the output of the current-to- voltage converters 300.1, 300.2, is the two signals A, B that are shown in FIG. 6a. Identically, the partial reference pulse signals from the reference pulse detector elements 24.1, 24.2 are delivered to the two current-to-voltage converters 300.4, 300.5 in the second processing channel. In the region of the reference position $X_{REF}=0$, the signals A, B that are shown in FIG. 6a are then again present at the outputs of these current-to-voltage converters.

The signals of the compensation detector elements 23.1–23.4 are connected to a further current-to-voltage converter 300.3; the corresponding compensation signal C at the output of the current-to-voltage converter 300.3, with a signal level that remains virtually constant, is again also shown in FIG. 5a. The thus-generated compensation signal C will hereinafter be used in both processing channels.

Next, with the aid of the compensation signal C, the sum of and the difference between the signals A and B are respectively formed in the two processing channels. For example, the subtraction signal D is the result of subtracting the signal B from the signal A so that D=A−B. The addition signal E is the result of subtracting the signal C from the sum of the two signals A and B so that E=A+B−C. The corresponding subtraction and addition signals in the form of the signals D and E are then present at the outputs of the correspondingly wired operational amplifiers 310.1, 310.2. The signals D and E are again shown in FIG. 6b. The processing of the signals A and B in the second processing channel proceeds accordingly, in which the subtraction signal D and the addition signal E are then present at the outputs of the two correspondingly wired operational amplifiers 310.3, 310.4.

With the aid of the downstream window comparators 320.1–320.4, the addition and subtraction signals E, D are then converted into corresponding square-wave signals G and F, as are shown again in FIG. 6c.

In each of the two processing channels, the logical AND combination of the two signals F and G is then done, via a combination unit 330.1, 330.2. A signal H, which is shown in FIG. 6d, is then present at the output of the combination units, in both processing channels in the region of the reference position $X_{REF}=0$.

The desired output reference pulse signal H' is finally generated by way of the logical AND combination, repeated another time, of the two signals H from the two processing channels with the aid of a third combination unit 330.3. The output reference pulse signal H', in the case of correct detection of partial reference pulse signals on both sides of the incremental grating line, is then identical to the signals H in the two processing channels.

The circuit arrangement shown in FIG. 5b offers a further advantage over the first circuit arrangement explained in conjunction with FIG. 5a. Because of the separate processing of the signals from the reference markings on both sides of the incremental grating line, it is now assured that a reference pulse signal will not be generated by mistake because of possibly soiling on one side. In the final analysis, this is assured by the concluding logical AND combination of the two signals H from the two processing channels via the combination unit 330.3.

This variant also assures that even in the event of rotation of the scanning unit relative to the scale, the phase relationship of the output reference pulse signal H' generated will remain the same relative to the incremental signals. This can be ascribed to the fact that the phase relationship of the various signals H from the opposed adjacent regions varies inversely to one another in such a case. Because of the logical AND combination done on the output side, once again the phase relationship of the resultant output reference pulse signal H' is preserved, however; in that case, only the width of the corresponding square-wave pulse H changes.

The components, provided in the two circuit arrangements in FIGS. 5a and 5b, for processing the partial reference pulse signals generated by the reference pulse detector elements are preferably also all disposed on sides of the scanning unit. This can be done for instance on the substrate body 25, on which all the remaining optoelectronic components are also disposed. On the output side, the scanning unit of the invention then furnishes not only the incremental signals but also the output reference pulse signal H, H', which can be further processed in the downstream evaluation unit.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. A scanning unit for an optical position measuring device, which is suitable for scanning a scale in a measurement direction, comprising:

a light source;

an incremental signal scanning arrangement, disposed symmetrical around the light source and comprising a plurality of incremental signal detector elements, which are each disposed relative to one another so that phase-offset partial incremental signals are generated from the scanning of an incremental grating line of a scale;

a first reference pulse detector element and a second reference pulse detector element, each of which are disposed vertically to a measurement direction and are each adjacent to the incremental signal scanning arrangement and generate an output reference pulse signal from the scanning of a first reference marking and a second reference marking located at one or more defined reference positions of the scale; and a plurality of compensation detector elements that generate a compensation signal with a constant signal level.

2. The scanning unit of claim 1, wherein first and second reference pulse detector elements are disposed on each side of the incremental signal scanning arrangement, and a first partial reference pulse signal is generated by way of the first reference pulse detector element and a second partial reference pulse signal is generated by way of the second reference pulse signal.

3. The scanning unit of claim 1, wherein the first and second reference pulse detector elements are each embodied in the shape of a rectangle, wherein the longitudinal axis of the rectangle is oriented parallel to the measurement direction.

4. The scanning unit of claim 2, wherein the first and second reference pulse detector elements on each side of the incremental signal scanning arrangement are spaced apart from one another in the measurement direction.

5. The scanning unit of claim 1, wherein the plurality of compensation detector elements are disposed between the incremental signal scanning arrangement and the first and second reference pulse detector elements are connected in series to one another.

6. The scanning unit of claim 5, wherein the plurality of compensation detector elements comprises four compensation detector elements that have the form of an isosceles triangle, and each of the compensation detector elements is placed symmetrically around the incremental signal scanning arrangement.

7. The scanning unit of claim 2, further comprising processor components that process the first and second partial reference pulse signals generated by the first and second reference pulse detector elements.

8. The scanning unit of claim 7, wherein the processor components form an addition signal and a subtraction signal based on the partial reference pulse signals that are present at the outputs of the first and second reference pulse detector elements that are offset from one another in the measurement direction, and after conversion of the addition and subtraction signals into square-wave signals, a logical AND combination of the addition and subtraction signals is effected, so that the logical AND combination furnishes the output reference pulse signal.

9. The scanning unit of claim 2, further comprising a first processing channel and a second processing channel, each with a plurality of electronic components, for processing the partial reference pulse signal that each of the first and second channels generates on a respective side of the incremental signal scanning arrangement.

10. The scanning unit of claim 7, further comprising a first processing channel and a second processing channel, each with a plurality of electronic components, for processing the partial reference pulse signal that each of the first and second channels generates on a respective side of the incremental signal scanning arrangement.

11. The scanning unit of claim 9, wherein each of the first and second processing channels is supplied with the partial reference pulse signals from the first and second reference pulse detector elements, and a reference pulse signal is present at the output of each of said first and second processing channels.

12. The scanning unit of claim 11, further comprising a combination unit to which the reference pulse signals on the output side of each of the first and second processing channels are supplied, so that the further-processable output reference pulse signal is present at an output of the combination unit.

13. The scanning unit of claim 12, wherein a logical AND combination is effected via the combination unit.

14. The scanning unit of claim 11, wherein each of the first and second processing channels comprises:
an addition component for addition and to which the partial reference pulse signals are delivered;
an subtraction component for subtraction and to which the partial reference pulse signals are delivered;
a first window comparator downstream of the addition component that converts input signals into square-wave output signals;
a second window comparator downstream of the subtraction component that converts input signals into square-wave output signals; and
a first combination unit downstream of the first window comparator to which the square-wave output signals of the first window comparator is supplied, and by way of which the first combination unit a logical AND combination is effected.

15. The scanning unit of claim 14, wherein downstream of the first and second processing channels is a second combination unit, by way of which a logical AND combination of the signals present at the output of the first and second processing channels is effected.

16. An optical position measuring device, comprising:
a scale comprising an incremental grating line, and a first reference marking and a second reference marking located at one or more defined reference positions of the scale;
a scanning unit comprising:
a light source;
an incremental signal scanning arrangement, disposed symmetrical around the light source and comprising a plurality of incremental signal detector elements, which are each disposed relative to one another so that phase-offset partial incremental signals are generated from the scanning of the incremental grating line of the scale by the scanning unit along a measurement direction;
a first reference pulse detector element and a second reference pulse detector element, each of which are disposed vertically to the measurement direction and are each adjacent to the incremental signal scanning arrangement and generate an output reference pulse signal from the scanning of the first reference marking and the second reference marking; and
a plurality of compensation detector elements that generate a compensation signal with a constant signal level.

17. The optical position measuring device of claim 16, wherein first and second reference pulse detector elements are disposed on each side of the incremental signal scanning arrangement, and a first partial reference pulse signal is generated by way of the first reference pulse detector element and a second partial reference pulse signal is generated by way of the second reference pulse signal.

18. The optical position measuring device of claim 16, wherein the first and second reference pulse detector elements are each embodied in the shape of a rectangle, wherein the longitudinal axis of the rectangle is oriented parallel to the measurement direction.

19. The optical position measuring device of claim 17, wherein the first and second reference pulse detector elements on each side of the incremental signal scanning arrangement are spaced apart from one another in the measurement direction.

20. The optical position measuring device of claim 16, wherein the plurality of compensation detector elements are disposed between the incremental signal scanning arrangement and the first and second reference pulse detector elements are connected in series to one another.

21. The optical position measuring device of claim 20, wherein the plurality of compensation detector elements comprises four compensation detector elements that have the form of an isosceles triangle, and each of the compensation detector elements is placed symmetrically around the incremental signal scanning arrangement.

22. The optical position measuring device of claim 13, further comprising processor components that process the first and second partial reference pulse signals generated by the first and second reference pulse detector elements.

23. The optical position measuring device of claim 22, wherein the processor components form an addition signal and a subtraction signal based on the partial reference pulse signals that are present at the outputs of the first and second reference pulse detector elements that are offset from one another in the measurement direction, and after conversion of the addition and subtraction signals into square-wave signals, a logical AND combination of the addition and subtraction signals is effected, so that the logical AND combination furnishes the output reference pulse signal.

24. The optical position measuring device of claim 17, further comprising a first processing channel and a second processing channel, each with a plurality of electronic components, for processing the partial reference pulse signal that each of the first and second channels generates on a respective side of-the incremental signal scanning arrangement.

25. The optical position measuring device of claim 22, further comprising a first processing channel and a second processing channel, each with a plurality of electronic components, for processing the partial reference pulse signal that each of the first and second channels generates on a respective side of the incremental signal scanning arrangement.

26. The optical position measuring device of claim 24, wherein each of the first and second processing channels is supplied with the partial reference pulse signals from the first and second reference pulse detector elements, and a reference pulse signal is present at the output of each of said first and second processing channels.

27. The optical position measuring device of claim 26, further comprising a combination unit to which the reference pulse signals on the output side of each of the first and second processing channels are supplied, so that the further-processable output reference pulse signal is present at an output of the combination unit.

28. The optical position measuring device of claim 27, wherein a logical AND combination is effected via the combination unit.

29. The optical position measuring device of claim 26, wherein each of the first and second processing channels comprises:
   an addition component for addition and to which the partial reference pulse signals are delivered;
   an subtraction component for subtraction and to which the partial reference pulse signals are delivered;
   a first window comparator downstream of the addition component that converts input signals into square-wave output signals;
   a second window comparator downstream of the subtraction component that converts input signals into square-wave output signals; and
   a first combination unit downstream of the first window comparator to which the square-wave output signals of the first window comparator is supplied, and by way of which the first combination unit a logical AND combination is effected.

30. The optical position measuring device of claim 29, wherein downstream of the first and second processing channels is a second combination unit, by way of which a logical AND combination of the signals present at the output of the first and second processing channels is effected.

31. A scanning unit for an optical position measuring device, which is suitable for scanning a scale in a measurement direction, comprising:
   a light source;
   an incremental signal scanning arrangement, disposed symmetrical around the light source and comprising a plurality of incremental signal detector elements, which are each disposed relative to one another so that phase-offset partial incremental signals are generated from the scanning of an incremental grating line of a scale;
   a first reference pulse detector element and a second reference pulse detector element, each of which are disposed vertically to a measurement direction and are each adjacent to the incremental signal scanning arrangement and generate an output reference pulse signal from the scanning of a first reference marking and a second reference marking located at one or more defined reference positions of the scale; and
   a plurality of compensation detector elements, which are used for generating a compensation signal, wherein the plurality of compensation detector elements are arranged in such a way, that each of the centers of gravity of their corresponding areas are located on a circle whose center coincides with an optical axis of the light source.

32. The scanning unit of claim 31, wherein the first reference pulse detector element is arranged around the incremental signal scanning arrangement in such a way, that a center of gravity of an area of the first reference pulse detector element is located on the circle whose center coincides with an optical axis of the light source.

33. The scanning unit of claim 32, wherein the second reference pulse detector element is arranged around the incremental signal scanning arrangement in such a way, that a center of gravity of an area of the second reference pulse detector element is located on the circle whose center coincides with an optical axis of the light source.

34. The scanning unit of claim 31, wherein the plurality of compensation detector elements are serially connected with each other.

35. The scanning unit of claim 31, wherein at least one of the plurality of compensation detector elements has a shape resulting from the combination of a rectangle and a triangle.

36. The scanning unit of claim 35, wherein the triangle is an isosceles triangle.

37. The scanning unit of claim 35, wherein the length of the legs of the triangle is selected to be identical to the width of the rectangle;
   a longitudinal axis of the rectangle is oriented perpendicularly with respect to the measurement direction; and
   a leg of the triangle adjoins a side of the rectangle, which is oriented in the direction of the plurality of incremental signal detector elements.

38. The scanning unit of claim 35, wherein said at least one of the plurality of compensation detector elements has a shape of a trapezoid.

39. The scanning unit of claim 31, wherein at least one of the plurality of compensation detector elements has a shape of a trapezoid.

40. The scanning unit of claim 31, wherein the first reference pulse detector element is designed to be square.

41. The scanning unit of claim 40, wherein the second reference pulse detector element is designed to be square.

42. A scanning unit for an, optical position measuring device, which is suitable for scanning a scale in a measurement direction, comprising:
   a light source;
   an incremental signal scanning arrangement, disposed symmetrical around the light source and comprising a plurality of incremental signal detector elements, which are each disposed relative to one another so that phase-offset partial incremental signals are generated from the scanning of an incremental grating line of a scale;
   a first reference pulse detector element and a second reference pulse detector element, each of which are disposed vertically to a measurement direction and are each adjacent to the incremental signal scanning arrangement and generate an output reference pulse signal from the scanning of a first reference marking and a second reference marking located at one or more defined reference positions of the scale; and
   a plurality of compensation detector elements, which are used for generating a compensation signal, wherein the first reference pulse detector element is arranged around the incremental signal scanning arrangement in such a way, that a center of gravity of an area of the first reference pulse detector element is located on a circle whose center coincides with an optical axis of the light source.

43. The scanning unit of claim 42, wherein the second reference pulse detector element is arranged around the incremental signal scanning arrangement in such a way, that a center of gravity of an area of the second reference pulse detector element is located on the circle whose center coincides with an optical axis of the light source.

44. The scanning unit of claim 42, wherein the plurality of compensation detector elements are serially connected with each other.

45. The scanning unit of claim 42, wherein at least one of the plurality of compensation detector elements has a shape resulting from the combination of a rectangle and a triangle.

46. The scanning unit of claim 44, wherein the triangle is an isosceles triangle.

47. The scanning unit of claim 45, wherein the length of the legs of the triangle is selected to be identical to the width of the rectangle;

a longitudinal axis of the rectangle is oriented perpendicularly with respect to the measurement direction; and a leg of the triangle adjoins a side of the rectangle, which is oriented in the direction of the plurality of incremental signal detector elements.

48. The scanning unit of claim 45, wherein said at least one of the plurality of compensation detector elements has a shape of a trapezoid.

49. The scanning unit of claim 42, wherein at least one of the plurality of compensation detector elements has a shape of a trapezoid.

50. The scanning unit of claim 42, wherein the first reference pulse detector element is designed to be square.

51. The scanning unit of claim 50, wherein the second reference pulse detector element is designed to be square.

52. A scanning unit for an optical position measuring device, which is suitable for scanning a scale in a measurement direction, comprising:

a light source;

an incremental signal scanning arrangement, disposed symmetrical around the light source and comprising a plurality of incremental signal detector elements, which are each disposed relative to one another so that phase-offset partial incremental signals are generated from the scanning of an incremental grating line of a scale;

a first reference pulse detector element and a second reference pulse detector element, each of which are disposed vertically to a measurement direction and are each adjacent to the incremental signal scanning arrangement and generate an output reference pulse signal from the scanning of a first reference marking and a second reference marking located at one or more defined reference positions of the scale; and a plurality of compensation detector elements, which are used for generating a compensation signal, wherein the total area of all reference pulse detector elements is substantially identical to the total area of the plurality of compensation detector elements.

53. The scanning unit of claim 52, wherein the plurality of compensation detector elements are serially connected with each other.

54. The scanning unit of claim 52, wherein at least one of the plurality of compensation detector elements has a shape resulting from the combination of a rectangle and a triangle.

55. The scanning unit of claim 53, wherein the triangle is an isosceles triangle.

56. The scanning unit of claim 54, wherein the length of the legs of the triangle is selected to be identical to the width of the rectangle;

a longitudinal axis of the rectangle is oriented perpendicularly with respect to the measurement direction; and a leg of the triangle adjoins a side of the rectangle, which is oriented in the direction of the plurality of incremental signal detector elements.

57. The scanning unit of claim 54, wherein said at least one of the plurality of compensation detector elements has a shape of a trapezoid.

58. The scanning unit of claim 52, wherein at least one of the plurality of compensation detector elements has a shape of a trapezoid.

59. The scanning unit of claim 52, wherein the first reference pulse detector element is designed to be square.

60. The scanning unit of claim 59, wherein the second reference pulse detector element is designed to be square.

* * * * *

UNITED STATES PATENT AND TRADEMARK OFFICE
CERTIFICATE OF CORRECTION

PATENT NO.   : 6,525,311 B1
DATED        : February 25, 2003
INVENTOR(S)  : Reiner Burgschat It is certified that error appears in the above-identified patent and that said Letters Patent is hereby corrected as shown below:

<u>Column 14,</u>
Line 44, delete "claim 13," and substitute -- claim 17, -- in its place.

Signed and Sealed this

Twenty-fifth Day of November, 2003

JAMES E. ROGAN
*Director of the United States Patent and Trademark Office*